United States Patent
Dyer et al.

(10) Patent No.: US 7,801,001 B2
(45) Date of Patent: Sep. 21, 2010

(54) MEDIA DISC RELIABILITY

(75) Inventors: Landon M. Dyer, Medina, WA (US); Richard E. Moore, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 459 days.

(21) Appl. No.: 11/924,360

(22) Filed: Oct. 25, 2007

(65) Prior Publication Data

US 2009/0109817 A1 Apr. 30, 2009

(51) Int. Cl. *G11B 5/09* (2006.01)
(52) U.S. Cl. .............. 369/53.15; 369/47.14; 369/47.1; 369/59.1
(58) Field of Classification Search .............. None
See application file for complete search history.

(56) References Cited

U.S. PATENT DOCUMENTS

| | | | | |
|---|---|---|---|---|
| 5,740,370 | A | 4/1998 | Battersby et al. | 395/200.49 |
| 6,023,584 | A | 2/2000 | Barton et al. | 395/712 |
| 6,119,261 | A | 9/2000 | Dang et al. | 714/769 |
| 6,920,589 | B2 | 7/2005 | Suh | 714/701 |
| 6,999,913 | B2 | 2/2006 | Hensley | 703/25 |
| 7,089,448 | B2 | 8/2006 | Hinshaw et al. | 714/6 |
| 7,496,608 | B2 * | 2/2009 | Wilbrink et al. | 714/15 |
| 2002/0199205 | A1 | 12/2002 | Sonawane et al. | 725/115 |

FOREIGN PATENT DOCUMENTS

WO  WO 2006/116293 A2  11/2006

OTHER PUBLICATIONS

Anderson, D. et al., "Failure-Atomic File Access in the Slice Interposed Network Storage System", 2002, Kluwer Academic Publishers, http://www.cs.duke.edu, 20 pages.

"Paragon CD-ROM Emulator v3.0", http://www.fileflash.com/program, Downloaded from the Internet Jul. 31, 2007, 2 pages.

* cited by examiner

*Primary Examiner*—Muhammad N. Edun
(74) *Attorney, Agent, or Firm*—Woodcock Washburn LLP

(57) ABSTRACT

Damage to removable or non-removable media or to content on the media may prevent access to content on the media. A processor may recognize a defect in the media, for example, due to read errors. The processor may request a "clean" (i.e., undamaged) or replaceable version of the non-readable media content. The processor may request the content over a network. The processor may store the requested content in local storage, such as in the cache or more permanent memory. The processor may read the requested portion directly over the network or from the stored location, rather than reading the damaged portion from the removable media. Once stored locally, the clean version may be available for subsequent access. Subsequently, the processor may request previously stored content from local storage without needing to request content over the network.

18 Claims, 6 Drawing Sheets

MEDIA DISC RELIABILITY

FIELD

The embodiments generally relate to the field of media reliability, and more particularly, to accessing content over a network for media reliability.

BACKGROUND

Damage to removable or non-removable media may prevent access to content on the media. Removable media such as CD-ROMs, DVDs, etc, are especially susceptible to damage due to increased handling, which increases the likelihood of scratches, fingerprints, or stains. Removable media and non-removable media are used for many applications such as distributing computer software or storing program data. Damage to the media may render portions of the media unreadable and/or render the media unusable for its intended purpose. For example, if a scratch interrupts the ability to read a sector on a DVD, the DVD may stall, stop, or skip over the unreadable sector.

The use of data recovery methods may minimize the effects of damaged media or media content. However, the media content may not be recoverable by these methods. For example, error correction codes that attempt to re-read the damaged content are known. However, the errors may exceed the error correction capability. Sometimes, the recovery method may simply skip over the damaged portion. This may not be acceptable in some applications. Also, the recovery method may cause excessive delays in attempting to correct the problem. Long delays in time-sensitive applications essentially render the media unusable. For example, users that run a game from a removable media, such as a DVD, often play against each other live over a network (e.g. a football game). In such a game, a loss of continuous play defeats the intended real-time purpose and therefore may render the media essentially unusable. A backup of the media content typically requires making a copy of the entire content because the user may not be able to anticipate damage to a specific portion of the media. Also, if the copy is not made prior to the damage, this solution may not be available for the damaged portion once the damage occurs. If existing data recovery methods fail, the user typically must replace the media.

Tools that can increase media or gaming reliability are valuable to any industry that uses media. It may be desirable to have a mechanism that provides media reliability for previously damaged media or for any subsequently damaged media. It may be desirable that the mechanism is viable as an alternative to or in addition to existing data recovery methods.

SUMMARY

This Summary is provided to introduce a selection of concepts in a simplified form that are further described below in the Detailed Description. This Summary does not intend to identify key features or essential features of the claimed subject matter, nor is it intended to be used to limit the scope of the claimed subject matter.

The techniques disclosed herein provide a mechanism for media reliability. A processor may recognize a defect in the media, for example, due to read errors. The processor may request a clean (i.e., undamaged) or replaceable version of the non-readable media content. Additional content may be requested or received to anticipate damage to other portions of the removable media.

In an example embodiment, the processor may request the content over a network. The processor may read the requested content rather than the damaged portion of the removable media. The processor may store the requested content in local storage for subsequent access, such as in the cache or more permanent memory. In another embodiment, the processor may request the previously stored content from local storage, rather than requesting the content over a network.

BRIEF DESCRIPTION OF THE DRAWINGS

The foregoing summary, as well as the following Detailed Description, is better understood when read in conjunction with the appended drawings. For the purpose of illustration, there is shown in the drawings exemplary constructions; however, the concepts are not limited to the specific methods and instrumentalities disclosed. In the drawings.

DETAILED DESCRIPTION

Figure 1:
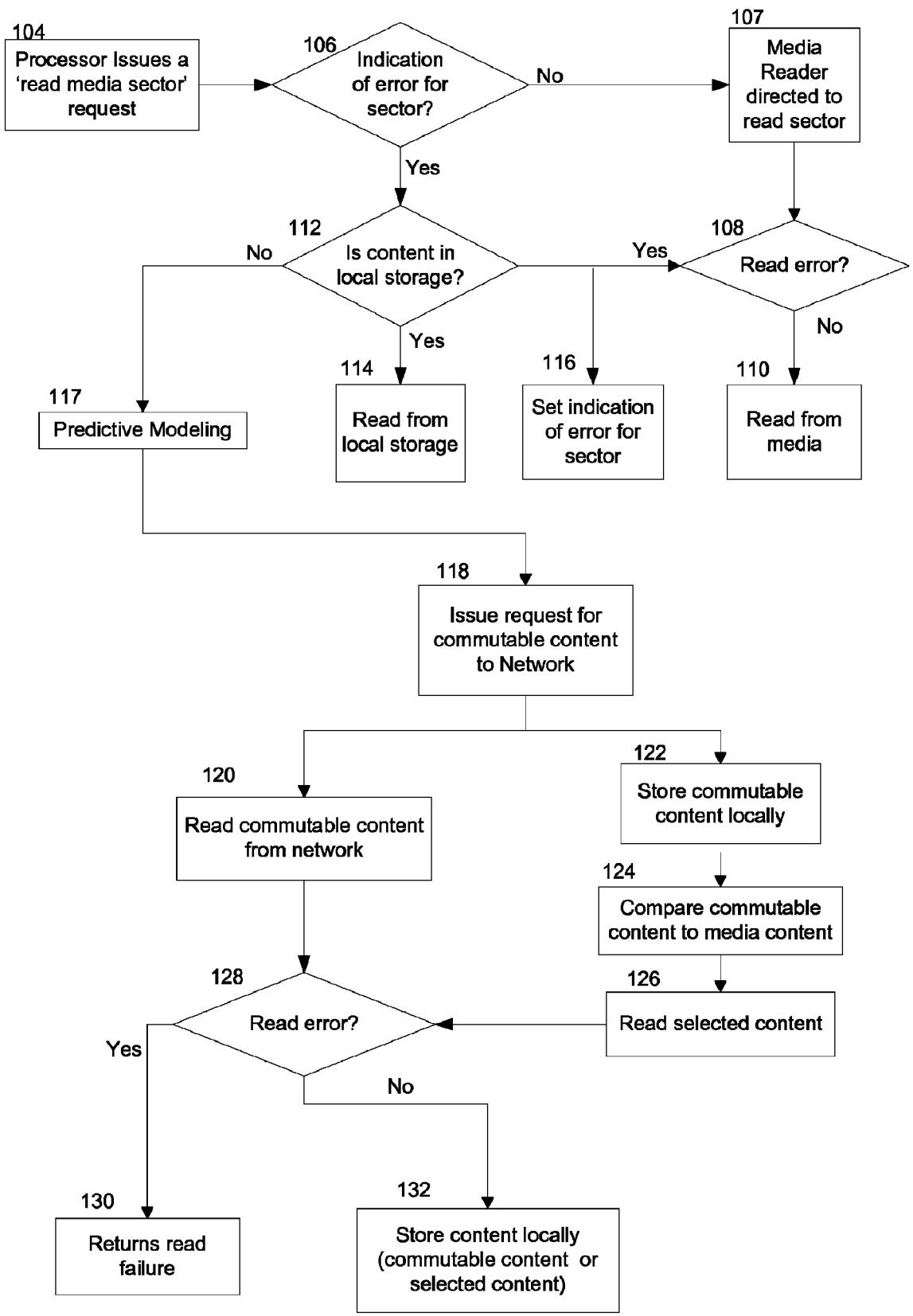
FIG. 1 is a flow diagram for requesting media content.

FIG. 1 is a flow diagram of an example embodiment of media reliability. At 104, the processor may issue a request to read a sector of media content on a removable media. Media content may include code, images, software, any information relating to games, entertainment, sports, information, industry, etc., or other data on the media. A sector is defined by the physical layout of content on a removable media. For example, a sector may be a portion of the media content on the removable media.

The method may include a determination at 106 of whether an indication of a read error is designated for the desired sector. For example, if a previous attempt to read the sector returned a read error, a flag may have been set to indicate the error. If there is not an indication of an error at 106, the processor may direct a read request to any appropriate media reader at 107. For example, the processor may direct the request to an optical disk drive capable of reading from and/or writing to a removable optical media such as a CD-ROM, DVD-ROM, HD-DVD, or other optical media. The processor may direct the request to a magnetic disk drive capable of reading from and writing to removable magnetic media, such as a floppy disk.

If the attempt to read the sector returns an error at 108, the error may prevent access to a portion of the media or media content. If there is no read error at 108, the processor may read the sector directly from the media at 110. An error may be the result of physical damage to the media, such as warping, surface contamination, or fatigue. An error may result from processing errors returned when the processor attempts to read damaged content on the media. Examples of processing errors may include an unreadable or inaccessible sector/data, inability to run or load data, corrupt files, or accidental deletion of data. If an error is discovered at 108, an indication of an error may be set at 116. The indication of error may be set at any time after encountering the error. Setting an indication of an error may reduce processing time for a subsequent read request at 104.

If there is a read error at 108 or an indication of an error at 106, the processor may determine whether content for the desired sector is in local storage at 112. If the desired sector is in local storage, the clean sector may be read from local storage at 114. The determination of whether an indication of a read error is designated at 106 is shown separately from the check for content in local storage 112, but the determination at 106 may include the check at 112, where the indication of an error may be the fact that the desired sector(s) is already in local storage. If the check at 112 is performed as part of the 106 determination, and the content is in local storage thereby indicating an error for the sector, the content may be read directly from local storage at 114. If an indication of an error is found at 106 (or 106 and 112 combined), reading directly from local storage at 114 may result in less processing time inasmuch as the attempt by the media reader to read the sector at 107 may not be necessary.

The read of the desired sector from local storage at 114 may be done without noticeable delays, if any. For example, the delay may be insignificant such that a user may not be aware that the processor is reading from local storage rather than the removable media.

The processor may issue a request for commutable content at 120 if there is an error and the desired sector is not in local storage at 112. Commutable content may include a clean (i.e., undamaged) version of the portion of media content that could not be read due to the error. Commutable content may also include data that is not identical but may nonetheless be read in place of the damaged portion of the media content. The commutable content may contain information that may rebuild or update the damaged sector.

Commutable content may include content in addition to the unreadable sector. Such additional content may be desirable to anticipate that damage may extend to a portion of the media beyond the sector that caused the read error. For example, a scratch on the surface of a CD or DVD may extend radially or circumferentially into additional sectors. The commutable content request at 118 may include a call for the additional content. The entity that processes the request also may make the determination to include additional content (shown in FIG. 2).

The determination to request or send additional content may be based on predictive modeling at 117. The predictive model may be tailored to a specific requester or may be based on data aggregated for a collection of users. The predictive model may be developed as appropriate for the media, the type of processor, the type of network, etc. For example, the predictive model may be based on a physical modeling of the failure. A radial scratch on a DVD may result in a predictable and identifiable set of numerically non-contiguous sectors that are potentially bad. If, for example, sector 1000 is unreadable, the request or entity processing the request may request or provide circumferentially-proximate sectors 999, 1000, 1001 to anticipate additional damage to the media. The additional content may also or alternatively include radially-proximate sectors to sector 1000, such as 1099, 1100, 1101 and 899, 900, and 901, for example. The actual sectors included would be based on the output of the predictive model, which may be based on the type of media being read. For example, in addition to radial or circumferential sectors on a DVD, a scratch may affect more than one layer of the DVD and vertical sectors of data may be requested or provided.

Following the issue request for commutable content over a network at 118, the commutable content may be read over the network at 120 or stored locally at 122, or a combination of the two. If the processor reads the commutable content over the network at 120, the content may be read in a streaming format. At 128, the determination of whether the commutable content may be read without error is made. If the commutable content is read over the network without error at 128, it may be stored locally at 132. Otherwise, a read failure may be returned at 130. If a read failure is returned, the error may be due to something other than the media.

Following the request to the network for commutable content at 118, the processor may store the commutable content locally at 122. A comparison of the commutable content and the content from the removable media at 124 may result in a selection of content to be read by the processor at 126. The content selected may include a combination of commutable content over the network and local content from the removable media. If the selected content is read without error at 128, the processor may store the selected content locally at 132 for subsequent access. Otherwise, a read failure may be returned at 130. Again, if a read failure is returned at 128, the error may be due to something other than the media.

Local storage may include any method of retaining the content for subsequent access by the processor. For example, storing the content locally may include storing the content in cache memory, such as processor cache or a hard disk cache. The processor may retrieve content more quickly from cache memory. Other examples of local storage are given with respect to FIGS. 5 and 6.

Once stored locally, the commutable content in local storage may be available for access at 112 upon a subsequent read request at 104. Upon a subsequent read request at 104, an indication of error for the desired sector may be found to be set at 106. If the indication of error is set at 106 (which may include the check for content in local storage at 112), or if the subsequent read error is discovered at 108, the content may be available at 112 and read from local storage at 114.

Figure 2:
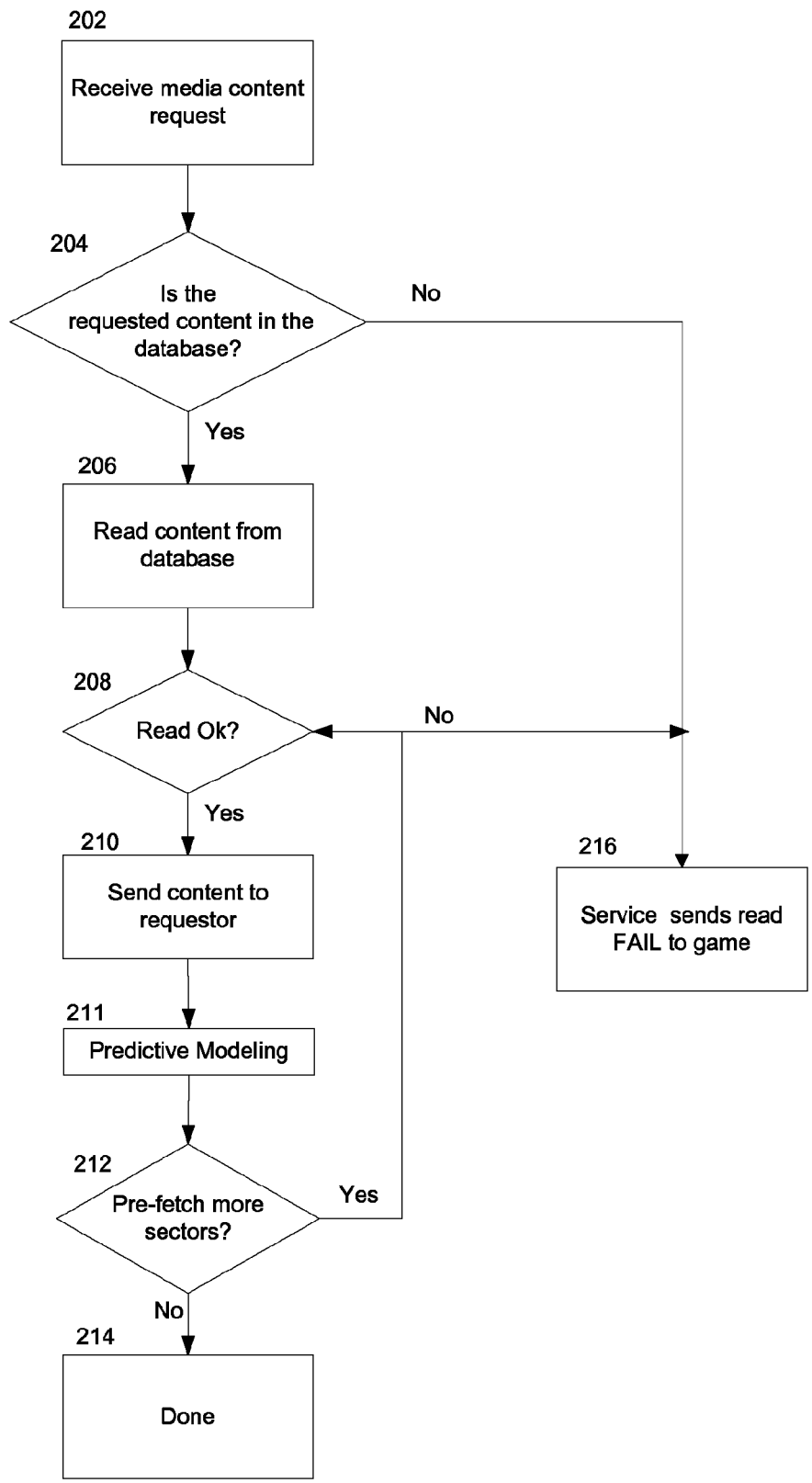
FIG. 2 is a flow diagram for receiving a request for media content.

FIG. 2 is a flow diagram for receiving a request for media content. The network service may receive a request for commutable content at 202. A determination may be made of whether the requested content or replaceable content is available from a database at 204. For example, the database could be a library of sector data. If the content is not available at 204, the network service may send a failure notification to the requestor at 216. If the content is available at 204, the network service may verify at 208 that the content may be read at 206 without error.

The network service may determine if additional content, such as additional sectors, should be sent to the requestor at 210. As discussed above with regards to the request of additional content to anticipate additional damage to the media, predictive modeling at 211 may be similarly utilized by the network service to determine if additional content should be sent to the requester. For example, the predictive model may be developed based on statistical data, such as common errors for a particular media type. The predictive model will determine whether more sectors should be pre-fetched at 212. At 208, the network service may verify that any additional content may be read without error. The commutable content, which may therefore include more content than originally requested, is sent to the requestor at 210. The requested commutable content, such as a game, video, music, etc., may be downloaded to the processor from which the request was made.

Figure 5:
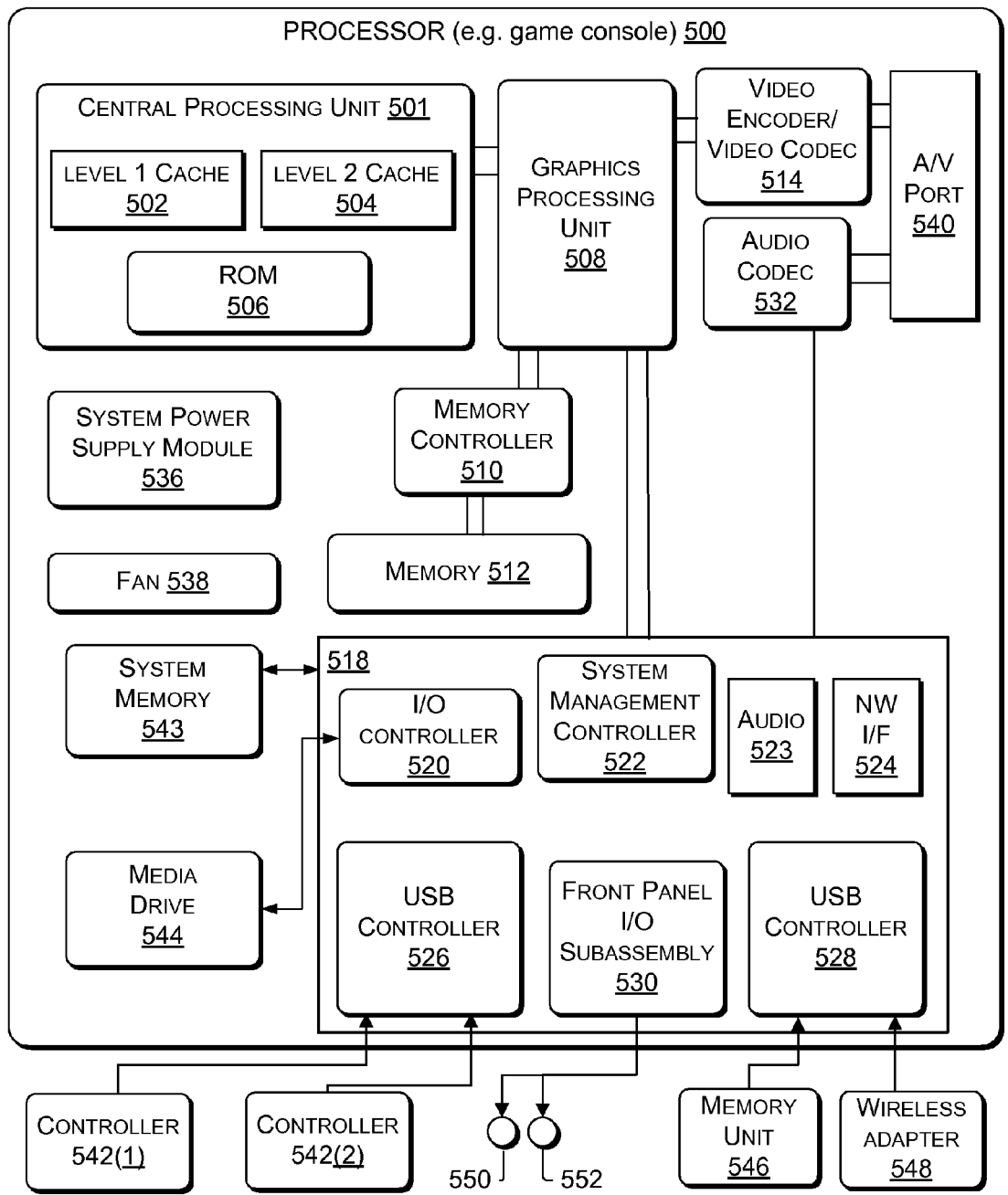
FIG. 5 is a block diagram illustrating an exemplary console that can be incorporated into a computer network environment.

An example of a known network configuration is the Microsoft Xbox® networking service. Microsoft Xbox® consoles support home network connections to a service called Xbox LIVE®. The online network, such as Xbox LIVE®, may store media content that is available to users upon request. If a processor, such as the Microsoft Xbox® console, encounters a read error when reading from a removable media, commutable content may be requested over the network service. At 204 in FIG. 2, Xbox LIVE® may check its stored content for requested content and read the content from the database at 206. The Xbox LIVE® service may also have a method of predictive modeling at 211. For example, if statistical data shows that a particular game distributed to users on a DVD continuously results in errors when reading, for example, sectors 100, 101, and 102, then a request for sector 100, or any other sector, may include sectors 100, 101, and 102. An exemplary network configuration, such as the Xbox LIVE® network, is shown in FIG. 5.

Figure 3:
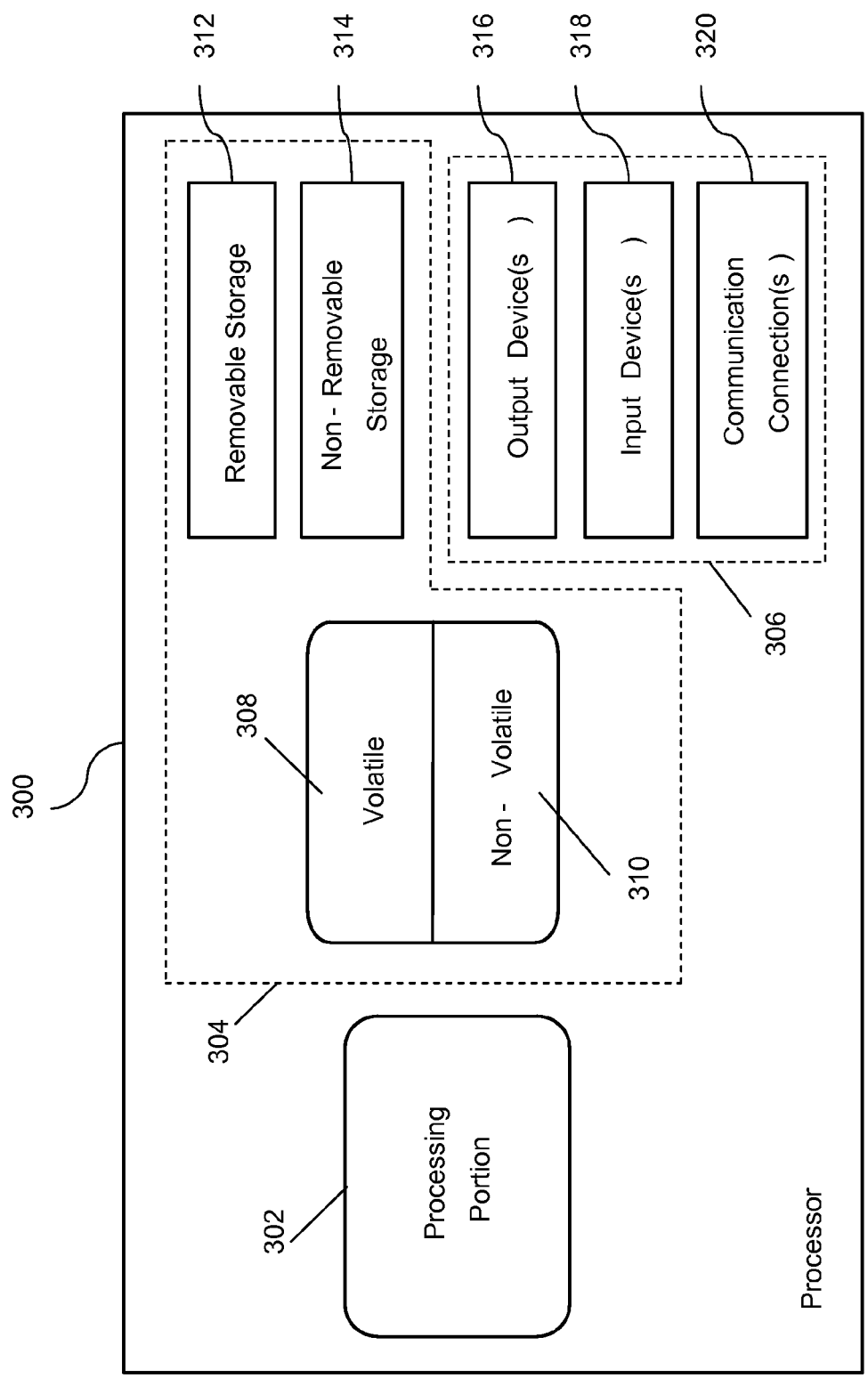
FIG. 3 illustrates a block diagram of one embodiment of a processor.

FIG. 3 is a block diagram of an exemplary processor 300 for implementing the media reliability mechanisms disclosed herein. The processor 300 may include a processing portion 302, a memory portion 304, and an input/output portion 306. Coupling the processing portion 302, memory portion 304, and input/output portion 306 together (coupling not shown in FIG. 3) may allow communications therebetween. The input/output portion 306 is capable of providing and/or receiving content over a network as described above.

The processor 300 can be implemented as a client processor and/or a server processor. In a basic configuration, the processor 300 can include at least one processing portion 302 and memory portion 304. The memory portion 304 can store any information utilized in conjunction with media reliability. Depending upon the exact configuration and type of processor, the memory portion 304 can be volatile (such as RAM) 308, non-volatile (such as ROM, flash memory, etc.) 310, or a combination thereof. The processor 300 may include both removable storage 312 and non-removable storage 314 including, but not limited to, magnetic or optical disks, tape, flash, smart cards or the like. Computer storage media, such as memory portions 304, 308, 310, 312, and 314, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 300. Any such computer storage media can be part of the processor 300.

The processor 300 can also contain communications connection(s) 320 that allow the processor 300 to communicate with other devices. Communications connection(s) 320 is an example of communication media. Communication media typically embodies computer readable instructions, data structures, program modules or other data in a modulated data signal such as a carrier wave or other transport mechanism and may include any information delivery media. Modulated data signal may compose a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein may include both storage media and communication media. The processor 300 also can have input device(s) 318 such as keyboard, mouse, pen, voice input device, touch input device, etc. Output device(s) 316 such as a display, speakers, printer, etc. also can be included.

Figure 4:
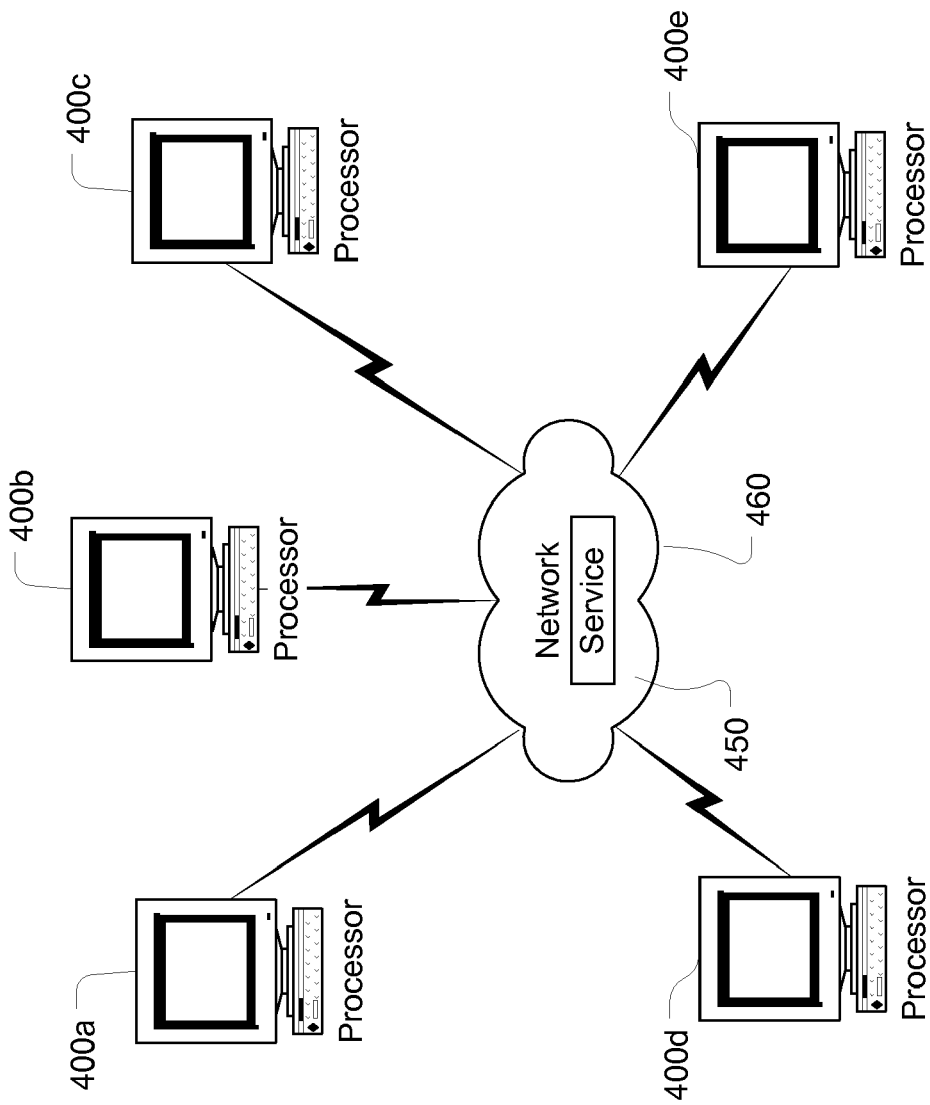
FIG. 4 is a block diagram of an exemplary computer network environment.

FIG. 4 is a diagram of an example computer network that may include aspects of media reliability. Computers 400*a*-400*e* may host various computing objects such as games or other applications. Although the physical environment shows the connected devices as computers, such illustration is merely for explanation and may comprise various digital devices and processors such as PDAs, game consoles, cellular telephones, etc. Moreover, communications network 460 may itself comprise a number of computers, servers and network devices such as routers and the like.

There are a variety of systems, components, and network configurations that support distributed computing environments. For example, computing systems may be connected together by wireline or wireless systems, by local networks or widely distributed networks. Currently, many of such networks are coupled to the Internet, which provides the infrastructure for widely distributed computing and may encompass many different networks. Aspects of various embodiments could be usable to distribute computer-readable instructions, code fragments, applications, and the like, to various distributed computing devices.

An example of a known network configuration is the Microsoft Xbox® networking service. Microsoft Xbox® consoles support home network connections to a service called Xbox LIVE®. Xbox LIVE® is an online network developed by Microsoft that enables Xbox® game systems to play with or against other Xbox® users over the Internet or other network. The service allows players to communicate verbally, maintains scoreboards, etc. The connection allows for multi-player Internet contact.

The online network, such as Xbox LIVE®, may store media content that is available to users upon request. The online network may have a centralized library or database at the remote network location. The network servers may have large processors or a network of large processors to hold a large amount of content. An online network or the media reliability mechanisms such as these may be available to subscribed users. Therefore, subscribed users may have access to the "clean" media content when there is a read error. A user-identifiable or processor-identifiable method may be utilized by the network to limit access to the media reliability mechanism offered by network service. If a user or a processor does not have access to the media reliability mechanism, but is connected to the network service, a method of inviting the user, such as a dialog box that is displayed at the user end, may invite the user to use or subscribe to the media reliability. Also, the servers may encode the data sent out to requesters to prevent piracy.

The network infrastructure enables a host of network topologies such as client/server, peer-to-peer, or hybrid architectures. The client is a member of a class or group that uses the services of another class or group to which it is not related. Thus, in computing, a client may be a process (i.e., a set of instructions or tasks) that requests a service provided by another program. The client process may utilize the requested service without having to know any working details about the other program or the service itself. In a client/server architecture, particularly a networked system, a client is usually a computer that accesses shared network resources provided by another computer (i.e., a server). A server may be a remote computer system accessible over a remote network such as, for example, the Internet. The client process may be active in a first computer system, and the server process may be active in a second computer system, communicating with one another over a communications medium, thus providing distributed functionality and allowing multiple clients to take advantage of the information-gathering capabilities of the server.

Clients and servers may communicate with one another using the functionality provided by a protocol layer. For example, Hypertext-Transfer Protocol (HTTP) is a common protocol that is used in conjunction with the World Wide Web (WWW). A computer network address such as a Uniform Resource Locator (URL) or an Internet Protocol (IP) address may be used to identify the server or client computers to each other. Communication among computing devices may be provided over a communications medium. In particular, the client and server may be operatively coupled to one another by way of TCP/IP connections for high-capacity communication.

In general, the computer network may comprise both server devices and client devices deployed in a network environment (in a peer-to-peer environment devices may be both clients and servers). Communications network 460 may be a LAN, WAN, intranet or the Internet, or any combination thereof that facilitates communication among a number of computing devices 400a-400e. Moreover, communication network 460 may comprise wireless, wireline or a combination of wireless and wireline connections. Additionally, the computer network may comprise a distributed computing environment. In such an environment, a computing task may be spread over a number of computing devices that are addressable elements in a computer network.

According to an embodiment, communication network 460 may host a network service 450 that is accessible from the plurality of computers 400a-400e. The network service 450 may gather information and track users of computers 400a-400e to provide computing services for the users of service 450. The network service may also employ the methods of media reliability, such as receiving a request for commutable content and complying with such request.

FIG. 5 is a block diagram of an example game console via which the media reliability techniques may be implemented. In general, the processor 500 is one type of computing device or system and is exemplary of a computing device or system that can be used in connection with a mechanism for requesting clean media content. In the example scenario, the processor 500 comprises a game console, such as an XBOX® game console for example. Media content played on or read by a game console 500 may include, but is not limited to, game content and such non-game content as movie content, music content, audio content, video content, video conferencing content, and/or digital video disk (DVD) content. The game content can also include, e.g., data and media relating to vehicles, characters, weapons, spells, levels, updated statistics, or other such graphically displayable or game usable information that applies to any particular game to be played on a game console that is generally known to user/players of game consoles. The media content can include any game content that can optionally be combined with non-game content.

Game console 500 has a central processing unit (CPU) 501 having a level 1 (L1) cache 502, a level 2 (L2) cache 504, and a flash ROM (Read-only Memory) 506. The level 1 cache 502 and level 2 cache 504 temporarily store data and hence reduce the number of memory access cycles, thereby improving processing speed and throughput. The flash ROM 506 can store executable code that is loaded during an initial phase of a boot process when the game console 500 is initially powered. Alternatively, the executable code that is loaded during the initial boot phase can be stored in a FLASH memory device (not shown). Further, ROM 506 can be located separate from CPU 501. Game console 500 can, optionally, be a multi-processor system; for example game console 500 can have three processors 501, 503, and 505, where processors 503 and 505 have similar or identical components to processor 501.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display device. A memory controller 510 is connected to the GPU 508 and CPU 501 to facilitate processor access to various types of memory 512, such as, but not limited to, a RAM (Random Access Memory).

Processor 500 may include an I/O controller 520, a system management controller 522, an audio processing unit 523, a network interface controller 524, a first USB host controller 526, a second USB controller 528 and a front panel I/O subassembly 530 that may be implemented on a module 518. The USB controllers 526 and 528 serve as hosts for peripheral controllers 542(1)-842(2), a wireless adapter 548, and an external memory unit 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless interface components including an Ethernet card, a modem, a Bluetooth module, a cable modem, and the like.

System memory 543 may store application data that is loaded during the boot process. A media drive 544 may comprise a DVD/CD drive, hard drive, or other removable media drive, etc. The media drive 544 may be internal or external to the game console 500. When media drive 544 is a drive or reader for removable media (such as removable optical disks, or flash cartridges), then media drive 544 is an example of an interface onto which (or into which) media are mountable for reading. The media drive 544 may access the application data 544 for execution, playback, etc. by game console 500. The media drive 544 may be connected to the I/O controller 520 via a bus, such as a Serial ATA bus or other high speed connection (e.g., IEEE 3394). While media drive 544 may generally refer to various storage embodiments (e.g., hard disk, removable optical disk drive, etc.), game console 500 may specifically include a hard disk 552, which can be used to store game data, application data, or other types of data.

The system management controller 522 may provide a variety of service functions related to assuring availability of the game console 500. The audio processing unit 523 and an audio codec 532 may form a corresponding audio processing pipeline with high fidelity, 3D, surround, and stereo audio processing according to aspects of the present subject matter described herein. A communication link may carry audio data between the audio processing unit 523 and the audio codec 526. The audio processing pipeline outputs data to the A/V port 540 for reproduction by an external audio player or device having audio capabilities.

The front panel I/O subassembly 530 supports the functionality of the power button 550 and the eject button 552, as well as any LEDs (light emitting diodes) or other indicators exposed on the outer surface of the game console 500. A system power supply module 536 may provide power to the components of the game console 500. A fan 538 may cool the circuitry within the game console 500.

The interconnection between the CPU 501, GPU 508, memory controller 510, and various other components within the game console 500 may be via one or more buses, including serial and parallel buses, a memory bus, a peripheral bus, and a processor or local bus using any of a variety of bus architectures.

When the game console 500 is powered on or rebooted, application data can be loaded from the system memory 543 into memory 512 and/or caches 502, 504 and executed on the CPU 501. The application can present a graphical user interface that provides a consistent user experience when navigating to different media types available on the game console 500. In operation, applications and/or other media contained within the media drive 544 may be launched or played from the media drive 544 to provide additional functionalities to the game console 500.

The game console 500 may be operated as a standalone system by simply connecting the system to a television or other display. In this standalone mode, the game console 500 may allow one or more users to interact with the system, watch movies, listen to music, and the like. However, with the integration of broadband connectivity made available through the network interface 524 or the wireless adapter 548, the game console 500 may further be operated as a participant in a larger network community.

FIG. 5 provides a brief general description of a suitable computing environment in which media reliability can be implemented. Although not required, various aspects of media reliability can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementations of media reliability can be practiced with other computer system configurations, including hand held devices, multi processor systems, microprocessor based or programmable consumer electronics, network PCs, minicomputers, mainframe computers, and the like. Further, media reliability also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 521, the memory (both ROM 564 and RAM 525), the basic input/output system (BIOS) 566, and various input/output (I/O) devices such as a keyboard 540, a mouse 562, a monitor 547, and/or a printer (not shown), among other things. The hardware component comprises the basic physical infrastructure for the computer system.

Figure 6:
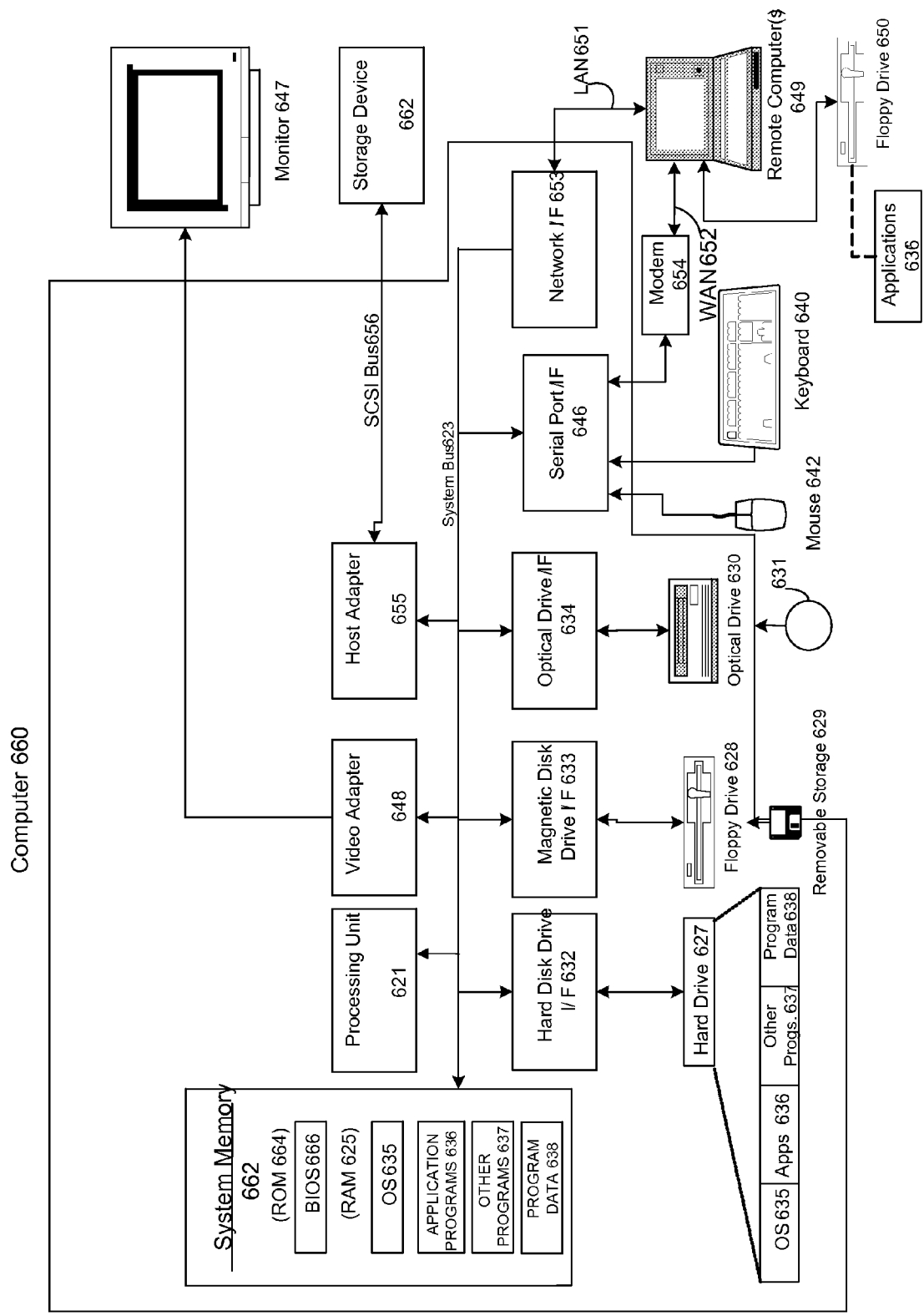
FIG. 6 is a block diagram of an exemplary computing environment.

As shown in FIG. 6, an exemplary general purpose computing system may include a conventional computing device, or processor, 660 or the like, including a processing unit 621, a system memory 662, and a system bus 623 that couples various system components including the system memory to the processing unit 621. The system bus 623 may be any of several types of bus structures including a memory bus or memory controller, a peripheral bus, and a local bus using any of a variety of bus architectures. The system memory may include read only memory (ROM) 664 and random access memory (RAM) 625. A basic input/output system 666 (BIOS), containing basic routines that help to transfer information between elements within the computing device 660, such as during start up, is stored in ROM 664. The computing device 660 may further include a hard disk drive 627 for reading from and writing to a hard disk (hard disk not shown), a magnetic disk drive 628 (e.g., floppy drive) for reading from or writing to a removable magnetic disk 629 (e.g., floppy disk, removal storage), and an optical disk drive 630 for reading from or writing to a removable optical disk 631 such as a CD ROM or other optical media. The hard disk drive 627, magnetic disk drive 628, and optical disk drive 630 are connected to the system bus 623 by a hard disk drive interface 632, a magnetic disk drive interface 633, and an optical drive interface 634, respectively. The drives and their associated computer readable media provide non volatile storage of computer readable instructions, data structures, program modules and other data for the computing device 660. Although the exemplary environment described herein employs a hard disk, a removable magnetic disk 629, and a removable optical disk 631, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk 627, removable storage 629, optical disk 631, ROM 664, or RAM 625, including an operating system 635, one or more application programs 636, other program modules 637, and program data 638. A user may enter commands and information into the computing device 660 through input devices such as a keyboard 640 and pointing device 662 (e.g., mouse). Other input devices (not shown) may include a microphone, joystick, game pad, satellite disk, scanner, or the like. These and other input devices are often connected to the processing unit 621 through a serial port interface 646 that is coupled to the system bus, but may be connected by other interfaces, such as a parallel port, game port, or universal serial bus (USB). A monitor 647 or other type of display device is also connected to the system bus 623 via an interface, such as a video adapter 648. In addition to the monitor 647, computing devices typically include other peripheral output devices (not shown), such as speakers and printers. The exemplary environment of FIG. 6 also may include a host adapter 655, Small Computer System Interface (SCSI) bus 656, and an external storage device 662 connected to the SCSI bus 656.

The computing device 660 may operate in a networked environment using logical connections to one or more remote computers, such as a remote computer 649. The remote computer 649 may be another computing device (e.g., personal computer), a server, a router, a network PC, a peer device, or other common network node, and typically may include many or all of the elements described above relative to the computing device 660, although only a memory storage device 650 (floppy drive) has been illustrated in FIG. 6. The logical connections depicted in FIG. 4 include a local area network (LAN) 651 and a wide area network (WAN) 652. Such networking environments are commonplace in offices, enterprise wide computer networks, intranets and the Internet.

When used in a LAN networking environment, the computing device 660 is connected to the LAN 651 through a network interface or adapter 653. When used in a WAN networking environment, the computing device 660 can include a modem 654 or other means for establishing communications over the wide area network 652, such as the Internet. The modem 654, which may be internal or external, is connected to the system bus 623 via the serial port interface 646. In a networked environment, program modules depicted relative to the computing device 660, or portions thereof, may be stored in the remote memory storage device. It will be appreciated that the network connections shown are exemplary and other means of establishing a communications link between the computers may be used.

While it is envisioned that numerous embodiments of media reliability are particularly well-suited for computerized systems, nothing in this document is intended to limit the claims to such embodiments. On the contrary, a computer system is intended to encompass any and all devices capable of storing and processing information may include anything capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for media reliability, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing media reliability.

The program(s) can be implemented in assembly or machine language, if desired. In any case, the language can be a compiled or interpreted language, and combined with hardware implementations. The methods and apparatuses for implementing media reliability also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of conserving power. Additionally, any storage techniques used in connection with media reliability can invariably be a combination of hardware and software.

While media reliability has been described in connection with the example embodiments of the various figures, it is to be understood that other similar embodiments can be used or modifications and additions can be made to the described embodiments for performing the same functions associated with media reliability without deviating therefrom. Therefore, media reliability as described herein should not be limited to any single embodiment, but rather should be construed in breadth and scope in accordance with the appended claims.

Different types of media content may be read by different types of processors. The mechanism for media reliability disclosed herein will work in a multitude of situations where the media or content on the media has been damaged or results in a read error.

What is claimed:

1. A method for storing commutable media content, comprising:
   encountering an error when reading said a removable medium, wherein said removable medium is coupled to a processor having an interface to a network, and wherein said error prevents access to local content on a portion of said removable medium;
   requesting commutable content over said network, wherein said processor sends a request over said network upon encounter of said error;
   receiving commutable content, wherein the commutable content comprises both readable content associated with the unreadable portion of the removable media and additional content determined based on predictive modeling, wherein the predictive modeling identifies the additional content based on statistical failures of at least one of a type of removable medium, a user, a plurality of users, or a history of failures associated with the removable media; and
   storing said commutable content for subsequent access.

2. The method of claim 1, further comprising reading said commutable content.

3. The method of claim 2, wherein reading said commutable content comprises reading said commutable content in lieu of reading said content on said portion of said removable medium.

4. The method of claim 1, further comprising:
   comparing said commutable content to said local content on said portion of said removable medium;
   selecting from a collective content, wherein said collective content comprises said commutable content and said local content on said portion of said removable medium.

5. The method of claim 1, further comprising:
   reading a selected portion of commutable content; and
   reading a selected portion of said local content on said portion of said removable medium.

6. The method of claim 1, wherein encountering said error when reading said removable medium further comprises storing information about said error.

7. The method of claim 6, wherein storing information about said error comprises setting an indication of said error for subsequent processing.

8. The method of claim 1, wherein storing said commutable content comprises storing said commutable content on at least one of: a memory of said processor, a hard drive, or a cache memory.

9. The method of claim 1, wherein said local content comprises game content.

10. A computer-readable medium having computer-executable instructions to perform a method for storing commutable media content, the method comprising:
    encountering an error when reading a removable medium, wherein said removable medium is coupled to a processor having an interface to a network, and wherein said error prevents access to local content on a portion of said removable medium;
    requesting commutable content over said network, wherein said processor sends a request over said network upon encounter of said error;
    receiving commutable content, wherein the commutable content comprises both readable content associated with the unreadable portion of the removable media and additional content determined based on predictive modeling, wherein the predictive modeling identifies the additional content based on statistical failures of at least one of a type of removable medium, a user, plurality of users, or a history of failures associated with the removable media; and storing said commutable content for subsequent access.

11. A system for storing commutable content requested over a network, comprising:
 a processor, wherein a removable medium is coupled to said processor and said processor is configured to:
  identify an error when reading a portion of content on said medium;
  send a request for commutable content over said network upon encounter of said error;
 a network interface, wherein said processor has access to a network through said network interface and receives commutable content over said network,
 wherein the received commutable content comprises both readable content associated with the unreadable portion of the removable media and additional content determined based on predictive modeling, and
 wherein the predictive modeling identifies the additional content based on statistical failures of at least one of a type of removable medium, a user, a plurality of users, or a history of failures associated with the removable media; and
 a storage unit that stores said commutable content for subsequent access.

12. The system of claim 11, wherein said means for storing said commutable content comprises at least one of: a memory of said processor, a hard drive, or a cache memory.

13. The system of claim 11, wherein said means for identifying an error when reading a portion of content on said medium comprises reading stored error information.

14. The system of claim 11, wherein said processor is a gaming system.

15. A method for media reliability, the method comprising:
 accessing information about an error, wherein said error prevents reading a portion of content from a removable medium;
 determining if commutable content is available in local storage, wherein said commutable content was previously requested over a network, read in lieu of the content on the portion of the removable medium, and stored locally;
 if the commutable content is available in local storage, reading the commutable content in lieu of reading said content on the portion of the removable medium.

16. The method of claim 15, wherein reading said commutable content comprises reading said commutable content in lieu of said content on said portion of said removable medium.

17. The method of claim 15, further comprising:
 comparing said commutable content to said content on said portion of said removable medium;
 selecting from a collective content, wherein said collective content comprises said commutable content and said content on said portion of said removable medium.

18. The method of claim 15, further comprising:
 reading a selected portion of commutable content; and
 reading a selected portion of said content on said portion of said removable medium.

* * * * *